(12) United States Patent
Gethmann

(10) Patent No.: US 7,624,963 B2
(45) Date of Patent: Dec. 1, 2009

(54) VALVE FLOW ADJUSTMENT DEVICE

(75) Inventor: Douglas Paul Gethmann, Gladbrook, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 455 days.

(21) Appl. No.: 11/676,147

(22) Filed: Feb. 16, 2007

(65) Prior Publication Data

US 2008/0197310 A1 Aug. 21, 2008

(51) Int. Cl.
*F16K 51/00* (2006.01)

(52) U.S. Cl. .................... 251/205; 251/285; 251/297

(58) Field of Classification Search ............... 251/284, 251/285, 205, 297
See application file for complete search history.

(56) References Cited

U.S. PATENT DOCUMENTS

| | | | | |
|---|---|---|---|---|
| 1,936,301 | A * | 11/1933 | Hansen et al. | 251/285 |
| 3,253,612 | A * | 5/1966 | Curatola et al. | 251/285 |
| 3,361,148 | A * | 1/1968 | Turek | 251/285 |
| 3,565,089 | A | 2/1971 | Thompson | |
| 3,589,413 | A * | 6/1971 | Vest et al. | 251/284 |
| 3,712,587 | A * | 1/1973 | Specht | 251/285 |
| 4,588,163 | A | 5/1986 | Christensen | |
| 5,080,575 | A * | 1/1992 | Berg et al. | 251/266 |
| 5,303,735 | A * | 4/1994 | Cerola et al. | 251/297 |
| 5,427,140 | A * | 6/1995 | Bosanquet | 251/285 |
| 5,823,509 | A | 10/1998 | Daniels | |
| 6,196,523 | B1 * | 3/2001 | Miyata et al. | 251/285 |
| 6,796,544 | B1 * | 9/2004 | Chen | 251/205 |
| 6,905,108 | B2 | 6/2005 | Hall et al. | |
| 2003/0089867 | A1 * | 5/2003 | Hall et al. | 251/60 |
| 2005/0035325 | A1 * | 2/2005 | Balasubramanian | 251/331 |

FOREIGN PATENT DOCUMENTS

| | | |
|---|---|---|
| EP | 0666521 | 8/1995 |
| FR | 2228996 | 12/1974 |

OTHER PUBLICATIONS

Patent Cooperation Treaty, "International Search Report," issued by the International Searching Authority in connection with international counterpart PCT application No. PCT/US2008/052176, mailed Jun. 23, 2008, 4 pages.

Patent Cooperation Treaty, "Written Opinion of the International Searching Authority," issued by the International Searching Authority in connection with international counterpart PCT application No. PCT/US2008/052176, mailed Jun. 23, 2008, 6 pages.

* cited by examiner

*Primary Examiner*—John Bastianelli
(74) *Attorney, Agent, or Firm*—Habley, Flight & Zimmerman, LLC

(57) ABSTRACT

A valve with a flow adjustment device in the form of a valve stem travel limiter includes a collar having a passage therethrough to receive a valve stem having a projection, the collar further includes a plurality of grooves having different depths. The flow adjustment device may be assembled to a valve stem to permit a plurality of different predetermined valve stem travel limits corresponding to respective different maximum flow capacities of the valve.

15 Claims, 5 Drawing Sheets

VALVE FLOW ADJUSTMENT DEVICE

FIELD OF THE DISCLOSURE

The disclosure relates generally to control valves having a valve stem movable for flow rate adjustment and, more particularly, to travel limiters for such valve stems to adjust maximum available flow rate.

BACKGROUND

Typically, a control valve includes a fluid inlet passage coupled through an orifice to a fluid outlet passage and a closure member disposed in the orifice, which controls the amount of fluid flow therethrough. The closure member may include a valve plug having a surface which engages the orifice forming a valve seat. During operation of a process control system, a process controller may issue a command signal to a control valve to move the valve plug toward or away from engagement with the valve seat to provide a desired fluid flow through the orifice and, therefore, the control valve.

Control valves typically experience variable process conditions during their lifetime. A gas well, for example, may have high pressure when first drilled, but decreasing pressure over time. To maintain constant fluid flow as pressure decreases, the valve must either be disassembled to install a valve seat having a larger flow passage or must be adjusted to allow the valve plug to travel farther from the valve seat to open more port area.

Thus, as a first alternative, to ensure that the valve will achieve the desired flow parameters, separate sets of valve plugs and valve seats may be installed. However, replacement of a valve plug and/or valve seat can necessitate disassembly and reassembly of the valve, which results in additional labor, and additional time the control valve is out of service. Accordingly, it is desirable to be able to achieve a plurality of desired flow parameters by using a single valve plug and a single valve seat.

There are devices which work in conjunction with a valve stem to provide multiple stem travel limits, such as are shown in U.S. Pat. No. 6,905,108. However, the known devices tend to be fairly expensive and difficult to remove and install. This may be due to the tendency to require serrations or threads along the valve stem, as well as along the internal surface of the travel limiting device which engages the valve stem. Also, the devices tend to require removable bolts to fasten pieces together, which may create problems concerning adequate access for manipulation of tools to assemble and disassemble the device during adjustments, as well as having to deal with multiple loose parts which require care in handling so as not to drop them, while at the same time the difficulty of achieving proper thread alignment when installing bolts, etc.

The more difficult and time consuming manipulation involved with the prior art devices can be particularly challenging when an operator is wearing gloves, such as may be necessary in a cold environment. Given that control valves often are directly mounted on a well head and must cycle, making a change with the prior art devices also tends to require that the system be shut down to avoid the normal movement of the valve stem when the control valve cycles. The time required to remove the prior art devices also is important when an operator needs to achieve a more open position, such as to allow the valve to be flushed. Thus, it would be preferable if each maximum flow rate change and flushing operation could be accomplished with less downtime of the control valve, resulting in greater productivity.

SUMMARY OF THE INVENTION

In accordance with one example, an apparatus for limiting the travel of a valve stem is provided in a valve having a housing that has a fluid inlet passage and a fluid outlet passage, with an orifice disposed between the fluid inlet passage and the fluid outlet passage. The apparatus further includes a valve plug adapted to move with respect to the orifice to vary the flow of fluid between the fluid inlet passage and the fluid outlet passage, a valve stem connected to the valve plug, with the valve stem having a projection disposed along a length of the valve stem that is disposed outside of the housing. The apparatus also includes a valve flow adjustment device having a plurality of grooves having different depths, the valve flow adjustment device being coupled to the valve stem and engageable with the projection, such that the valve flow adjustment device provides a plurality of preselected positions that limit the valve stem travel and correspond to a plurality of different maximum flow capacities of the valve.

In accordance with another example, a valve flow adjustment device includes a valve stem having a projection. The device further includes a collar having a passage therethrough, wherein the collar also slidably engages the valve stem and has a plurality of preselected positions for engagement with the projection with the plurality of preselected positions being adapted to limit movement of the valve stem to respective different maximum travel positions.

In yet another example, a valve flow adjustment device includes a valve stem having a projection. The device further includes a collar coupled to the valve stem and having a longitudinal passage therethrough and a plurality of positions to selectively engage the projection and to thereby limit travel of the valve stem. The device also includes a resilient member that engages the collar and biases the collar to remain in engagement with the projection.

With the example constructions, a flow adjustment device is provided that limits the travel of a valve stem. The device may include one or more pieces that form a collar around the valve stem. The collar has a passage therethrough and slidably receives the valve stem. The collar includes grooves of different depths that can be formed by having their features cast, molded or machined into the one or more pieces that form the collar. In accordance with the valve flow adjustment device, the flow adjustment device may be assembled to the valve stem to permit a plurality of different predetermined stem travel limits.

The valve stem requires a projection to engage the collar, but no special machining or formation of threads or concentric grooves. Thus, the projection may be formed in a variety of ways such as, for example, by a press fit pin at least partially protruding from the valve stem.

Having a projection on the valve stem permits the collar to simply be installed on the valve stem and rotated to vary the valve stem travel between different predetermined settings. Depending on the orientation of the collar, if the relatively most shallow groove is oriented toward the projection, it will contact the projection and limit the valve stem travel based on the distance between the top of the collar and the top of the groove. Alternatively, if a deeper groove is oriented toward the projection, the projection will contact the top of the deeper groove, thus limiting the travel by even less of the overall height of the collar. Thus, the collar may be rotated to adjust between a plurality of predetermined valve stem travel limits.

The collar may be held in place via gravity or a resilient member such as a coil spring or other means. Advantageously, the collar position may be conveniently adjusted without tools or manipulation of bolts or screws, and the collar may be made without some of the special machining and assembly techniques associated therewith. In turn, the device can be quite small and compact, allowing for shorter, lighter and less expensive valve assemblies having fewer parts. Such devices will require less time to adjust and, therefore, are more likely to permit rapid changes in maximum flow capacity during normal system operation, between strokes of the valve stem.

Thus, a flow adjustment device is provided that limits the travel of a valve stem. The device provides a plurality of different travel limits, which correspond to a plurality of different predetermined positions that may be achieved with respect to a maximum valve stem travel and thereby a plurality of different respective maximum flow characteristics for the valve.

Depending on the configuration chosen, the device minimizes the drawbacks of the prior art while permitting a user to quickly change the maximum flow capacity of a valve entirely via action taken outside of, or external to, the valve housing. Indeed, the operator may be able to make a flow adjustment without use of tools, and between strokes of the valve stem, depending on the cycle time. This not only improves productivity by not having to shut down the fluid system, but also reduces operator time and effort, which can have a significant impact financially, as well as to the comfort of an operator working in inclement weather.

It is to be understood that both the foregoing general description and the following detailed description are exemplary and provided for purposes of explanation only, and are not restrictive of the invention, as claimed. Further features and objects of the present invention will become more fully apparent from the following description of the preferred embodiments and from the appended claims.

It should be understood that the drawings are not necessarily to scale.

While other plan and section views are not included, the details such views would show are considered to be adequately shown in the present views or well within the comprehension of those skilled in the art in light of the present disclosure. It also should be understood that the present invention is not limited to the examples illustrated.

DETAILED DESCRIPTION

Figure 1:
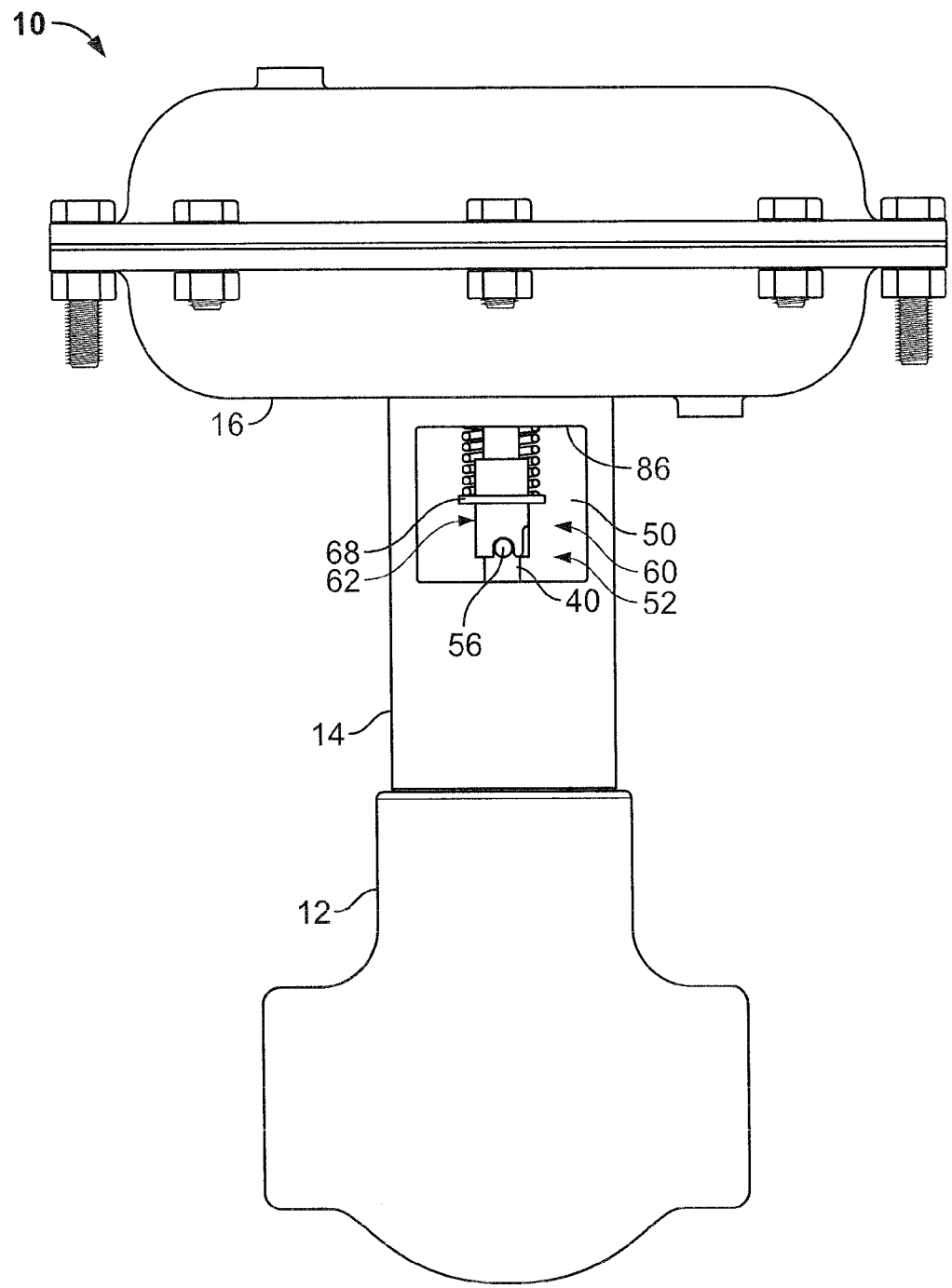
FIG. 1 is a front view of a valve including a flow adjustment device.
Figure 2:
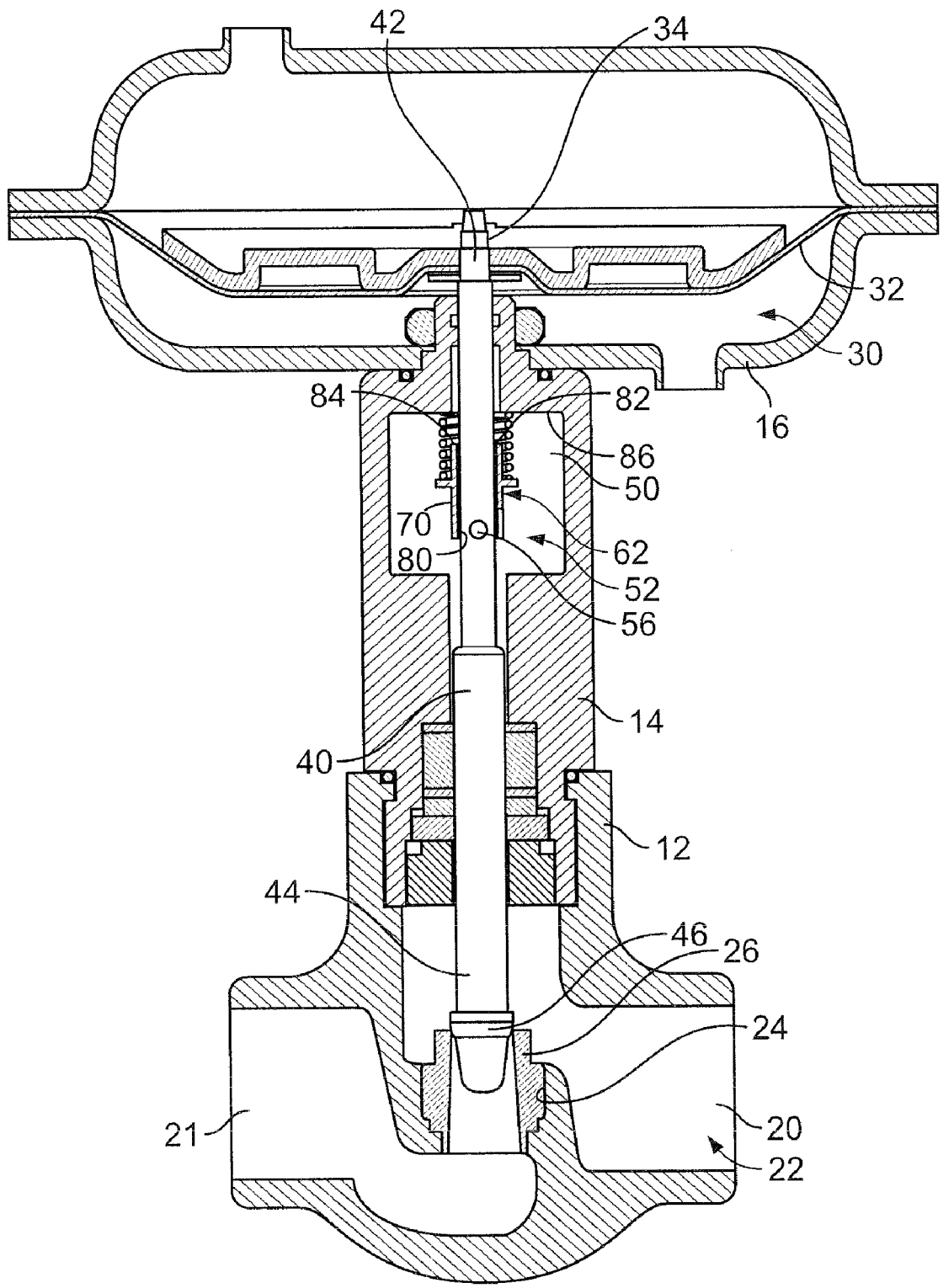
FIG. 2 is a cross-sectional view the valve of FIG. 1.
Figure 3:
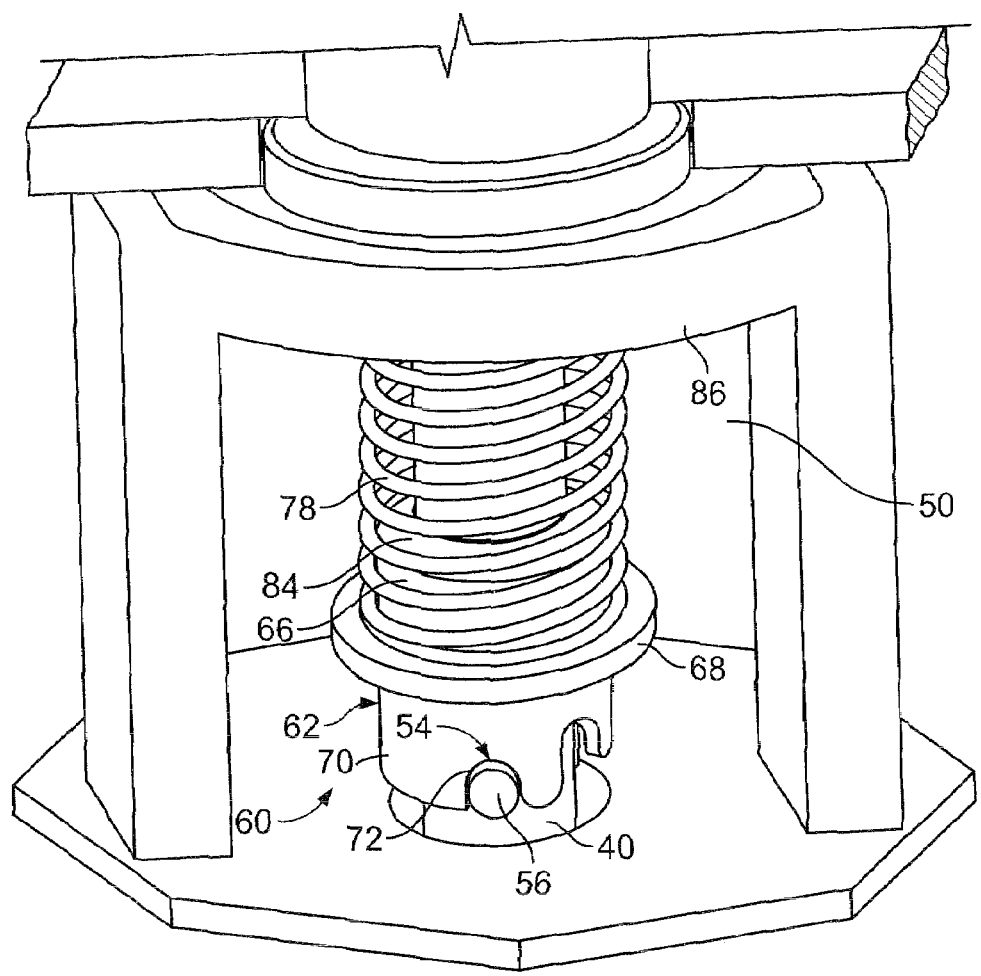
FIG. 3 is a perspective view of a flow adjustment device mounted to a valve stem, in accordance with the example shown in FIGS. 1 and 2.
Figure 4:
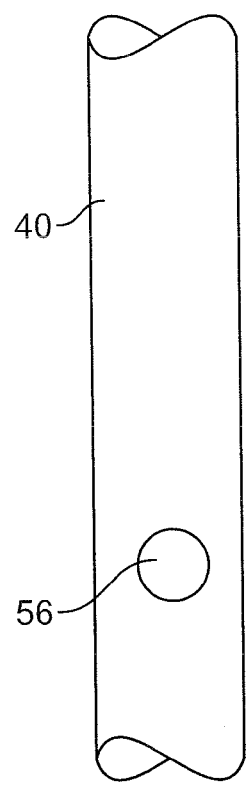
FIG. 4 is a front view of a valve stem in accordance with the example shown in FIGS. 1 and 2.
Figure 5:
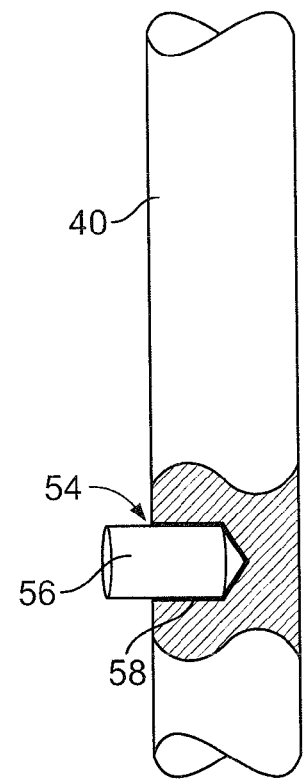
FIG. 5 is a partial cross-sectional view of the valve stem in accordance with the example shown in FIG. 4.

Referring now to the drawings, FIGS. 1 and 2 show an example of a control valve assembly 10 that includes a valve body 12 connected to a bonnet 14. The bonnet 14, in turn, is connected to a diaphragm casing 16. The diaphragm casing 16 houses a sliding stem actuator, which may take other forms. The sliding stem actuator can be of any suitable type for use with control valves. The control valve assembly 10 may be joined by conventional methods, such as flange mounting, to fluid piping components within a larger process control system.

Passing through the bonnet 14 is a valve stem 40. Valve stem 40 is to be coupled to and driven by the sliding stem actuator at its proximal or upper end 42. The valve stem 40 passes through the bonnet 14 and downward into the valve body 12. In this example, coupled to the lower end 44 of the valve stem 40 is a valve plug 46. The valve plug 46 includes a seating surface on its lower side. It will be appreciated that the valve stem 40 and valve plug 46 may be machined from a single piece, or may be formed in separate pieces for connection by common fastening methods.

The valve body 12 includes an inlet passage 20 and an outlet passage 21. A valve flow path 22 is formed between the inlet passage 20 and the outlet passage 21. Disposed between the inlet passage 20 and outlet passage 21 is an orifice 24. In this example, the orifice 24 receives a removable valve seat 26, although it will be appreciated that a valve seat may be integrally formed in the valve body 12 at the orifice 24. In this example, the valve plug 46 is shaped and sized to permit sealing engagement with the valve seat 26. The valve plug 46 cooperates with the valve seat 26 in the orifice 24 to control the port area through which fluid may flow from the inlet passage 20 to the outlet passage 21. Thus, the flow rate permitted through the control valve assembly 10 is controlled by the position of the valve stem 40 and, therefore, the position of the valve plug 46 relative to the valve seat 26. In FIG. 2, the valve plug 46 is shown in a closed position, with the seating surface of the valve plug 46 fully engaging the valve seat 26.

In this example, the diaphragm casing 16 houses a common diaphragm control unit 30 having a diaphragm 32 that responds to control pressures to raise or lower a central mounting hub 34, forming a sliding stem actuator in a manner well known in the art. It will be appreciated that alternative actuator units may be used. Also, the example flow adjustment device would be applicable to many types of valves having a valve stem, whether they are control valves, throttling valves or on/off valves.

By virtue of the vertical movement of the central mounting hub 34 and its coupling to upper end 42 of the valve stem 40, the valve stem 40 and valve plug 46 may move through a range of longitudinal travel in the control valve assembly 10. This range of travel includes, at one extreme, being in a closed position when the valve plug 46 is in sealing engagement with the valve seat 26, and at another extreme, being in a fully open, preselected maximum flow rate position when the valve stem 40 is moved to the full extent of its permitted travel.

In this example, the bonnet 14 has an opening 50 by which an intermediate portion 52 of the valve stem 40 is accessible from outside of the control valve assembly 10. In turn, the exposed intermediate portion 52 of the valve stem 40 has a projection 54 formed by a pin 56 inserted into an aperture 58 in the valve stem 40. It will be appreciated that a projection on the valve stem may be formed or provided in a variety of ways. To selectively limit the maximum upward travel of valve stem 40, and thereby preselect a maximum flow rate position for the valve plug 46 relative to the valve seat 26, a flow adjustment device 60 may be coupled to valve stem 40 within the opening 50 in the bonnet 14.

The flow adjustment device 60 shown in the example in FIGS. 1-5 includes a collar 62 that may be combined with the projection 54 to achieve a plurality of alternative valve stem travel limits. The collar 62 may be formed of one or more pieces and is shown as a two-piece assembly having a tubular portion 66 and a shoulder portion 68. The tubular portion 66 and shoulder portion 68 may be formed separately and then joined by conventional means, or may be made from an integral piece. They also may be constructed of a variety of materials, such as plastics, metals or the like, and may be molded or formed by other conventional means. The tubular portion 66 and the shoulder portion 68 may be configured to be split to allow the collar 62 to be removed from the valve stem 40 without disassembly of the valve assembly 10.

Figure 7C:
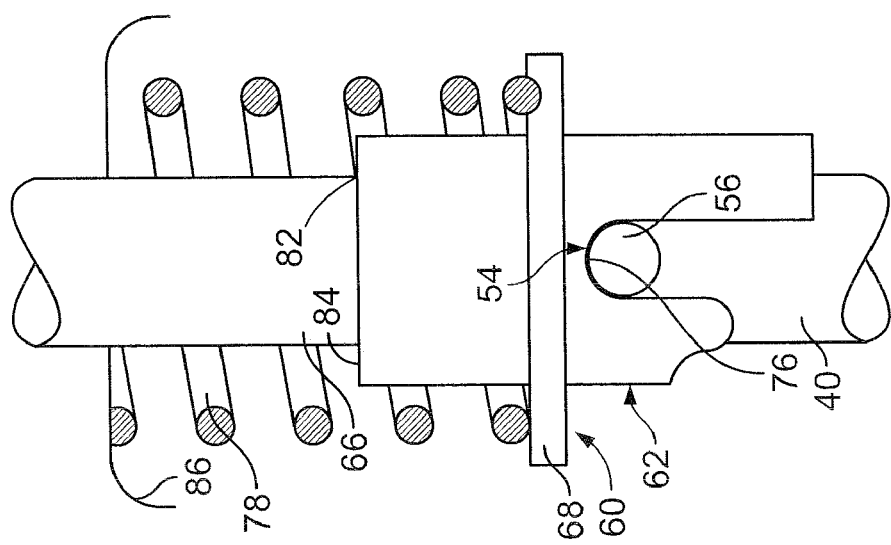
FIGS. 7A-7C are front views of the flow adjustment device in accordance with the example shown in FIGS. 1 and 2, and in three different respective travel limiting positions.

In the example shown, the shoulder portion 68 is welded around the outer wall 70 of the tubular portion 66. The tubular portion 66 has an outer wall 70 having a stepped series of grooves or notches 72, 74, 76 formed therein, and each stepped groove has a semi-circular arcuate relief for solid engagement with the projection 54 on the valve stem 40. A resilient member 78, shown in the illustrated example as a spring, abuts the top surface of the shoulder 68 and encircles the tubular portion 66. With this example configuration, the collar 62 may be held in one of a plurality of travel limiting positions by the compression of the resilient member 78 that keeps the projection 54 nested in one of the adjustment grooves 72, 74, 76, as shown in FIGS. 7A-7C.

It will be appreciated by one of ordinary skill it the art that the collar 62 has an inner wall 80 that forms a passage 82 through the collar 62. The diameter of the passage 82 is slightly larger than the outer diameter of the valve stem 40 in the region above the projection 54. As can be best seen in FIGS. 7A-7C, the collar 62 may be installed on the valve stem 40 to achieve a plurality of travel limiting positions. In the first position shown in FIG. 7A, due to the projection 54 being located in the shallow first groove 72, as the valve stem 40 is moved upward its maximum travel will be limited when an upper end 84 of the collar 62 engages an upper surface 86 of the opening 50 in the bonnet 14. This will correspond to a first preselected maximum travel of the valve stem 40, and thereby to a first preselected maximum flow rate of the control valve assembly 10.

Figure 7B:
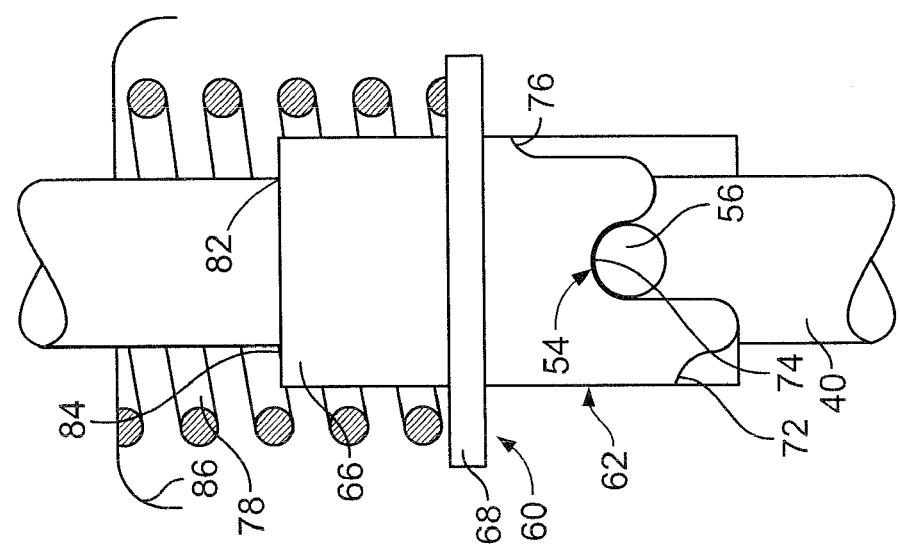
Figure 7A:
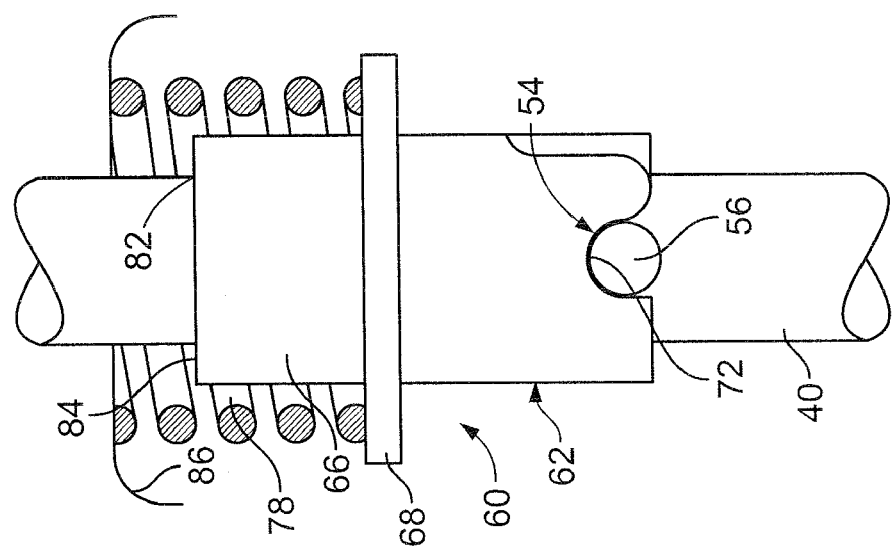

As shown in FIG. 7B, a second preselected maximum travel of the valve stem 40, and thereby a second preselected maximum flow rate may be selected if the collar 62 is rotated to locate the projection 54 in the second groove 74. By selecting this second position of the collar 62 on the valve stem 40, the valve stem 40 is permitted to move further upward until the upper end 84 of the collar 62 engages the upper surface 86 of the opening 50 in the bonnet 14. The further permitted movement in this second position allows the valve plug 46 to move further from the valve seat 26, so as to open more port area, and thereby corresponds to a second preselected maximum flow rate of the control valve assembly 10.

In the illustrated example, as shown in FIG. 7C, a third preselected maximum travel of the valve stem 40, and thereby a third preselected maximum flow rate may be selected if the collar 62 is rotated to locate the projection 54 in the third groove 76. In this third position, the valve stem 40 is permitted to move still further upward until the upper end 84 of the collar 62 engages the upper surface 86 of the opening 50 in the bonnet 14. The third position results in the valve plug 46 moving still further from the valve seat 26, opening more port area and providing a third preselected maximum flow rate.

It will be appreciated that the configuration shown in the illustrated example provides a travel limiter that may be engaged by a user and adjusted between travel limiting positions without use of any tools. Indeed, the resilient member 78 provides a continuous biasing force to keep the projection 54 in the groove 72, 74 or 76, as selected by an operator. The continuous biasing force provided by the resilient member 78 also makes this configuration of a flow adjustment device 60 suitable for use on valves, regardless of whether the valve stem 40 is in a vertical, horizontal or other orientation. It also will be appreciated that without the resilient member 78, the collar 62 may be used in an upright position of the valve assembly 10, due to gravity. However, it would not be appropriate for use in a horizontal position, unless it utilizes a means to keep the collar 62 engaged with the projection 54.

Figure 6:
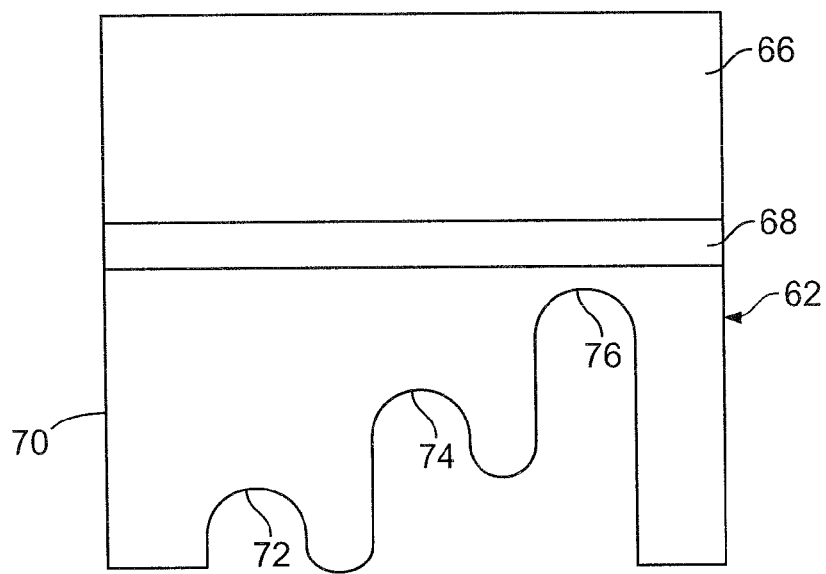
FIG. 6 is a planar representation of the outer cylindrical wall of a collar of a flow adjustment device in accordance with the example shown in FIGS. 1 and 2.

In FIG. 6, a planar representation of the outer wall 70 of the collar 62 is shown with three increasing designated travel distances associated with the three grooves 72, 74 and 76. These groove depths are shown for example only, and it will be appreciated by one of ordinary skill in the art that a greater or lesser number of grooves may be used and with different depths and different increments, as desired.

It will be appreciated by one of ordinary skill in the art that the collar 62 may be constructed in an alternative manner to permit the tubular portion 66 to be split along its outer wall 70 for complete removal from or installation onto the valve stem 40 through the opening 50 in the bonnet 14. The shoulder 68 also may be configured for removal from or installation onto the tubular portion 66, such as by being formed as a split ring. With the collar 62 removed, the valve stem 40 would be free to move to a position of maximum travel, which may be beneficial, such as when flushing a valve.

Thus, each of the above examples provides a simplified adjustment device that is external to the valve body, yet can create variable effective port sizes by adjusting the fully opened position of a valve plug relative to an orifice, via a valve stem travel limiter. This is a significant improvement over the conventional, more time consuming and, therefore, more expensive practice of having to open the control valve to replace the valve seat or valve plug to change the potential maximum port area, while also providing an improvement over other afore-mentioned more complicated and expensive valve stem and flow adjustment device combinations.

Although certain example devices and articles of manufacture have been described herein, the scope of coverage is not limited thereto. It will be apparent to those skilled in the art that various modifications can be made in the design and construction of such flow adjustment devices and cooperating valve stems without departing from the scope or spirit of the present invention as claimed, and that the claims are not limited to the illustrated examples. For example, the projection may be provided by a pin inserted into a through-hole in the valve stem such that double projections are provided diametrically on both sides of the valve stem. The collar may subsequently have reciprocal and symmetric grooves to engage the double projections. Additionally, the position of the collar and the resilient member may be reversed along the valve stem such that the flow limiting device may be used in a flow-up or flow-down configuration. Thus, while a flow adjustment device may be provided using any variety of suitable materials of construction, configurations, shapes and sizes for the components and methods of connecting the components, this application covers all devices and articles of manufacture fairly falling within the scope of the appended claims.

What is claimed is:

1. A valve comprising:
    a housing having a fluid inlet passage and a fluid outlet passage;
    an orifice disposed between the fluid inlet passage and the fluid outlet passage;
    a valve plug adapted to move with respect to the orifice to vary the flow of fluid between the fluid inlet passage and the fluid outlet passage;

a valve stem connected to the valve plug, the valve stem having a projection disposed along a length of the valve stem that is disposed outside of the housing;

a valve flow adjustment device having a plurality of grooves having different depths, the valve flow adjustment device being coupled to the valve stem and engageable with the projection, wherein the valve flow adjustment device provides a plurality of preselected positions that limit the valve stem travel and correspond to a plurality of different maximum flow capacities of the valve; and a resilient member to bias the valve flow adjustment device against the projection to selectively maintain the valve flow adjustment device in one of the preselected positions.

2. A valve as defined in claim 1, wherein the projection comprises a pin.

3. A valve as defined in claim 1, wherein the projection is formed on a portion of the valve stem having an aperture in the valve stem and comprises a pin received in the aperture and extending outward from the valve stem.

4. A valve as defined in claim 1, wherein the valve flow adjustment device further comprises at least two collar portions that together encircle and slidably engage the valve stem.

5. A valve as defined in claim 4, further comprising a tubular portion and a shoulder portion.

6. A valve as defined in claim 4, wherein the at least two collar portions are part of a unitary piece.

7. A valve as defined in claim 1, wherein the valve flow adjustment device is moved against a biasing force provided by a resilient member when the valve flow adjustment device is moved from a first preselected position to a second preselected position.

8. A valve as defined in claim 1, wherein the maximum flow capacity of the valve can be adjusted from a first preselected position to a second preselected position without removing the flow adjustment device or the projection from the valve stem.

9. A valve flow adjustment device comprising:

a valve stem having a projection;

a collar coupled to the valve stem and having a longitudinal passage therethrough and a plurality of grooves having different depths to selectively engage the projection wherein the plurality of grooves provide a plurality of preselected positions that limit the valve stem travel and correspond to a plurality of different maximum flow capacities of the valve; and a resilient member that engages the collar and biases the collar to remain in engagement with the projection.

10. A valve flow adjustment device as defined in claim 9, wherein the collar further comprises at least two portions.

11. A valve flow adjustment device as defined in claim 10, wherein the at least two collar portions are connected together.

12. A valve flow adjustment device as defined in claim 10, wherein the at least two collar portions are part of a unitary piece.

13. A valve flow adjustment device as defined in claim 9, wherein the resilient member further comprises a spring that slidably engages the valve stem.

14. A valve flow adjustment device as defined in claim 9, wherein the plurality of grooves open toward the projection when the collar is in sliding engagement with the valve system.

15. A valve flow adjustment device as defined in claim 9, wherein the collar further comprises a tubular portion having a shoulder that engages the resilient member.

* * * * *